United States Patent
Matsui

(10) Patent No.: US 12,121,847 B2
(45) Date of Patent: Oct. 22, 2024

(54) GAS TREATMENT METHOD AND GAS TREATMENT DEVICE

(71) Applicant: SHOWA DENKO K.K., Tokyo (JP)

(72) Inventor: Kazuma Matsui, Tokyo (JP)

(73) Assignee: Resonac Corporation, Tokyo (JP)

( * ) Notice: Subject to any disclaimer, the term of this patent is extended or adjusted under 35 U.S.C. 154(b) by 420 days.

(21) Appl. No.: 17/595,409

(22) PCT Filed: Jul. 16, 2020

(86) PCT No.: PCT/JP2020/027717
§ 371 (c)(1),
(2) Date: Nov. 16, 2021

(87) PCT Pub. No.: WO2021/024746
PCT Pub. Date: Feb. 11, 2021

(65) Prior Publication Data
US 2022/0193597 A1    Jun. 23, 2022

(30) Foreign Application Priority Data

Aug. 6, 2019  (JP) ................. 2019-144440

(51) Int. Cl.
*B01D 53/04* (2006.01)
*B01J 20/18* (2006.01)
(Continued)

(52) U.S. Cl.
CPC .... *B01D 53/0446* (2013.01); *B01D 2253/102* (2013.01); *B01D 2253/108* (2013.01); *B01D 2253/308* (2013.01)

(58) Field of Classification Search
CPC .......... B01D 53/0446; B01D 2253/102; B01D 2253/108; B01D 2253/308; B01D 53/02;
(Continued)

(56) References Cited

U.S. PATENT DOCUMENTS

| 4,820,318 | A |   | 4/1989 | Chang et al. |
| 5,015,365 | A | * | 5/1991 | Vara ...................... B01D 53/04 208/262.5 |

(Continued)

FOREIGN PATENT DOCUMENTS

| CN | 88 1 01700 A | 10/1988 |
| CN | 1561318 A | 1/2005 |

(Continued)

OTHER PUBLICATIONS

International Preliminary Report on Patentability, with translation of Written Opinion, issued Feb. 8, 2022 in International Application No. PCT/JP2020/027717.

(Continued)

*Primary Examiner* — Frank M Lawrence, Jr.
(74) *Attorney, Agent, or Firm* — Sughrue Mion, PLLC

(57) ABSTRACT

Provided are a gas treatment method and a gas treatment device capable of efficiently removing a bromofluoroethylene. A gas containing a bromofluoroethylene is brought into contact with an adsorbent (7) having pores with an average pore diameter of 0.4 nm or more and 4 nm or less in a temperature environment of not less than 0° C. and less than 120° C. to allow the adsorbent (7) to adsorb the bromofluoroethylene, and thus the bromofluoroethylene is separated from the gas.

20 Claims, 1 Drawing Sheet

(51) Int. Cl.
    *B01J 20/20*     (2006.01)
    *B01J 20/28*     (2006.01)

(58) Field of Classification Search
    CPC ............ B01D 2256/10; B01D 2256/18; B01D 2257/2062; B01D 2257/2066; B01D 2257/704; B01D 53/04; B01D 53/70; B01D 53/81; B01J 20/28078; B01J 20/18; B01J 20/20; B01J 20/28; Y02P 70/50; C01B 32/306; C01B 39/14; C01B 39/22; H01L 21/3065
    USPC .............................................. 96/108; 95/142
    See application file for complete search history.

(56) References Cited

U.S. PATENT DOCUMENTS

| | | | |
|---|---|---|---|
| 5,231,980 | A | 8/1993 | Filipovic et al. |
| 5,425,242 | A * | 6/1995 | Dunne ............... B60H 1/00585 62/85 |
| 5,904,909 | A * | 5/1999 | Yates .................... B01D 53/70 95/131 |
| 6,967,260 | B2 | 11/2005 | Ohno et al. |
| 2003/0034309 | A1 | 2/2003 | Ohno et al. |
| 2007/0028771 | A1 | 2/2007 | Shin et al. |
| 2009/0249953 | A1 | 10/2009 | Millward et al. |
| 2012/0222556 | A1 | 9/2012 | Filipovic et al. |
| 2014/0073139 | A1 | 3/2014 | Suzuki |
| 2015/0336864 | A1 | 11/2015 | Filipovic et al. |
| 2016/0312096 | A1 | 10/2016 | Bulinski et al. |
| 2016/0347693 | A1 | 12/2016 | Fukushima et al. |
| 2018/0320040 | A1 | 11/2018 | Bulinski et al. |
| 2019/0225852 | A1 | 7/2019 | Bulinski et al. |
| 2021/0217627 | A1 | 7/2021 | Tanitomo |

FOREIGN PATENT DOCUMENTS

| | | |
|---|---|---|
| CN | 101479220 A | 7/2009 |
| CN | 105829659 A | 8/2016 |
| EP | 0 284 227 A2 | 9/1988 |
| JP | 2017-047338 A | 3/2017 |
| TW | 583177 B | 4/2004 |
| TW | 201416123 A | 5/2014 |
| TW | 201930648 A | 8/2019 |
| WO | 2012/124726 A1 | 9/2012 |
| WO | 2015/125877 A1 | 8/2015 |

OTHER PUBLICATIONS

International Search Report for PCT/JP2020/027717, dated Aug. 25, 2020.

* cited by examiner

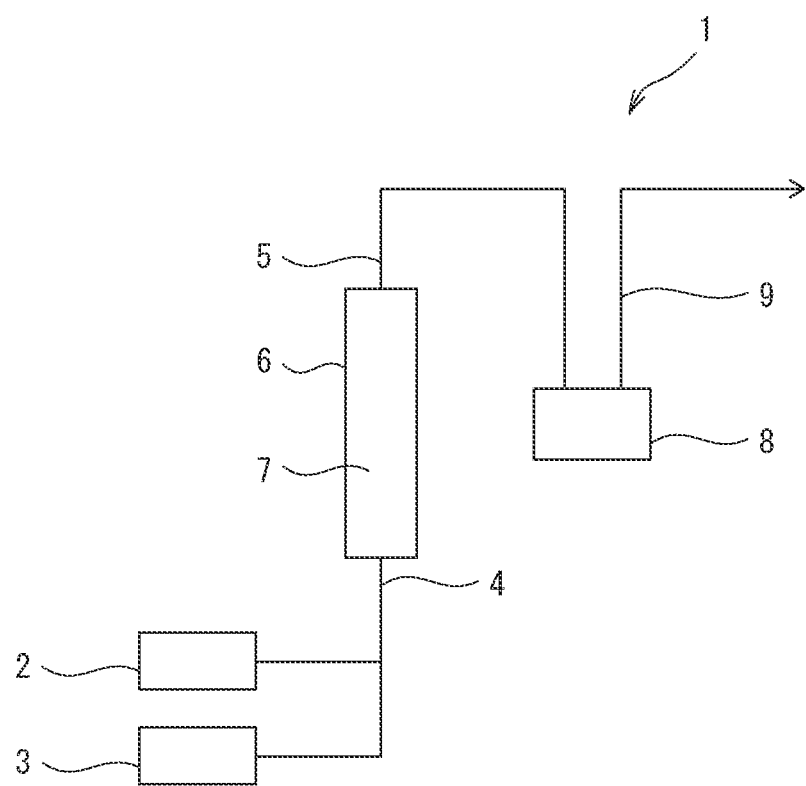

GAS TREATMENT METHOD AND GAS TREATMENT DEVICE

CROSS REFERENCE TO RELATED APPLICATIONS

This application is a National Stage of International Application No. PCT/JP2020/027717 filed Jul. 16, 2020, claiming priority based on Japanese Patent Application No. 2019-144440 filed Aug. 6, 2019.

TECHNICAL FIELD

The present invention relates to a gas treatment method and a gas treatment device.

BACKGROUND ART

In semiconductor production processes, perfluorocarbons such as carbon tetrafluoride and hexafluoroethane are used as the etching gas for dry etching systems or as the chamber cleaning gas for CVD systems. These perfluorocarbons are very stable compounds and have a large impact on global warming, and thus perfluorocarbons emitted to the atmosphere can adversely affect the environment. Hence, the exhaust gases discharged from semiconductor production processes are preferably emitted to the atmosphere after the contained perfluorocarbons are recovered or decomposed.

PTL 1 discloses, as an alternative to the above perfluorocarbons, a plasma etching gas containing a bromofluorocarbon having a double bond (bromofluoroalkene) as a plasma etching gas having a low environmental load. Bromofluoroalkenes have a lower impact on global warming than perfluorocarbons having no double bond, such as carbon tetrafluoride and hexafluoroethane, but the impact is not low enough to be negligible. Bromofluoroalkenes are highly toxic and could adversely affect the human body and the environment if emitted without treatment. Hence, the exhaust gases discharged from semiconductor production processes are required to be emitted to the atmosphere after the contained bromofluoroalkenes are recovered and decomposed.

As the treatment method of bromofluoroalkenes, for example, PTL 2 discloses a method of adsorbing a bromofluoroalkene having three or four carbon atoms onto zeolite.

CITATION LIST

Patent Literatures

PTL 1: WO 2012/124726
PTL 2: JP 2017-47338 A

SUMMARY OF INVENTION

Technical Problem

However, no method of efficiently removing a bromofluoroalkene having two carbon atoms (bromofluoroethylene) has been developed.

The present invention is intended to provide a gas treatment method and a gas treatment device capable of efficiently removing a bromofluoroethylene.

Solution to Problem

To solve the above problems, the present invention includes the following aspects [1] to [9].

[1] A gas treatment method including bringing a gas containing a bromofluoroethylene into contact with an adsorbent having pores with an average pore diameter of 0.4 nm or more and 4 nm or less in a temperature environment of not less than 0° C. and less than 120° C. to allow the adsorbent to adsorb the bromofluoroethylene, thus separating the bromofluoroethylene from the gas.

[2] The gas treatment method according to the aspect [1], in which the bromofluoroethylene is at least one of bromotrifluoroethylene, 1-bromo-2,2-difluoroethylene, (E)-1-bromo-1,2-difluoroethylene, (Z)-1-bromo-1,2-difluoroethylene, 1-bromo-1-fluoroethylene, (E)-1-bromo-2-fluoroethylene, (Z)-1-bromo-2-fluoroethylene, 1,1-dibromo-2-fluoroethylene, (E)-1,2-dibromo-2-fluoroethylene, (Z)-1,2-dibromo-2-fluoroethylene, and tribromofluoroethylene.

[3] The gas treatment method according to the aspect [1] or [2], in which the gas containing a bromofluoroethylene is a mixed gas of the bromofluoroethylene and an inert gas.

[4] The gas treatment method according to the aspect [3], in which the inert gas is at least one of nitrogen gas, helium, argon, neon, and krypton.

[5] The gas treatment method according to any one of the aspects [1] to [4], in which the gas containing a bromofluoroethylene contains the bromofluoroethylene at a content of less than 25% by volume.

[6] The gas treatment method according to any one of the aspects [1] to [5], in which the adsorbent is at least one of zeolite and activated carbon.

[7] The gas treatment method according to any one of the aspects [1] to [6], in which the temperature environment is 0° C. or more and 100° C. or less.

[8] The gas treatment method according to any one of the aspects [1] to [6], in which the temperature environment is 0° C. or more and 70° C. or less.

[9] A gas treatment device including an adsorption treatment container containing an adsorbent having pores with an average pore diameter of 0.4 nm or more and 4 nm or less, where the adsorption treatment container includes an inlet through which a gas containing a bromofluoroethylene is fed and an outlet through which a treated gas after adsorption treatment of the gas containing a bromofluoroethylene with the adsorbent is discharged from an inside of the adsorption treatment container to an outside.

Advantageous Effects of Invention

According to the present invention, a bromofluoroethylene can be efficiently removed.

BRIEF DESCRIPTION OF DRAWINGS

The FIGURE is a schematic view illustrating a structure of a gas treatment device pertaining to an embodiment of the present invention.

DESCRIPTION OF EMBODIMENTS

Embodiments of the present invention will now be described below. The embodiments are merely examples of the present invention, and the present invention is not limited to the embodiments. Various modifications or improvements can be made in the embodiments, and such modifications and improvements can also be encompassed by the present invention.

A gas treatment device 1 of the present embodiment includes an adsorption column 6 (corresponding to the "adsorption treatment container" as a constituent of the present invention) containing an adsorbent 7 having pores with an average pore diameter of 0.4 nm or more and 4 nm or less. The adsorption column 6 has an inlet 4 through which a gas containing a bromofluoroethylene is fed and has an outlet 5 through which a treated gas after adsorption treatment of the gas containing a bromofluoroethylene with the adsorbent 7 is discharged from the inside of the adsorption column 6 to the outside.

The gas treatment device 1 of the present embodiment further includes a bromofluoroethylene gas feeding mechanism 2 configured to feed a bromofluoroethylene gas, an inert gas feeding mechanism 3 configured to feed an inert gas, and a Fourier transformation infrared spectrophotometer 8 configured to perform Fourier transformation infrared spectroscopic analysis.

The bromofluoroethylene gas feeding mechanism 2 is connected to the inlet 4 of the adsorption column 6 through a pipe, and a bromofluoroethylene gas sent from the bromofluoroethylene gas feeding mechanism 2 is fed through the inlet 4 into the adsorption column 6 and undergoes adsorption treatment with the adsorbent 7 in a temperature environment of not less than 0° C. and less than 120° C.

The gas fed through the inlet 4 into the adsorption column 6 can be a bromofluoroethylene gas containing only a bromofluoroethylene or can be a mixed gas of a bromofluoroethylene gas and an additional type of gas. The additional type of gas may be any gas, and examples include an inert gas. In other words, as illustrated in the FIGURE, a pipe extending from the bromofluoroethylene gas feeding mechanism 2 can join with a pipe extending from the inert gas feeding mechanism 3, and a joined pipe can be connected to the inlet 4 of the adsorption column 6.

With such a structure, a bromofluoroethylene gas sent from the bromofluoroethylene gas feeding mechanism 2 is mixed with an inert gas sent from the inert gas feeding mechanism 3 in the joined pipe to give a mixed gas, and the mixed gas is fed through the inlet 4 into the adsorption column 6. Hereinafter, a bromofluoroethylene gas containing only a bromofluoroethylene and a mixed gas of a bromofluoroethylene gas and an additional type of gas are also called a "bromofluoroethylene-containing gas".

The bromofluoroethylene-containing gas fed into the adsorption column 6 comes into contact with the adsorbent 7 in a temperature environment of not less than 0° C. and less than 120° C. and undergoes adsorption treatment with the adsorbent 7. In other words, the bromofluoroethylene in the bromofluoroethylene-containing gas is adsorbed by the adsorbent 7, and accordingly the bromofluoroethylene-containing gas is separated into the bromofluoroethylene and an additional type of gas.

The treated gas after adsorption treatment with the adsorbent 7, or the separated additional type of gas, is discharged from the adsorption column 6 through the outlet 5 to the outside. The outlet 5 is connected to the Fourier transformation infrared spectrophotometer 8 through a pipe, and accordingly the treated gas is fed to the Fourier transformation infrared spectrophotometer 8.

With the Fourier transformation infrared spectrophotometer 8, the treated gas undergoes Fourier transformation infrared spectroscopic analysis, and quantitative analysis or qualitative analysis of the bromofluoroethylene contained in the treated gas is performed.

To the Fourier transformation infrared spectrophotometer 8, a discharge pipe 9 is connected, and the treated gas after Fourier transformation infrared spectroscopic analysis is discharged through the discharge pipe 9 out of the system.

With the gas treatment device 1 of the present embodiment, a bromofluoroethylene can be efficiently removed in mild conditions without complicated operations.

The gas treatment device 1 of the present embodiment and the gas treatment method of the present embodiment will next be described in further detail.

[Bromofluoroethylene]

A bromofluoroethylene is an unsaturated hydrocarbon having two carbon atoms and having a fluorine atom and a bromine atom in the molecule.

Specific examples of the bromofluoroethylene include bromotrifluoroethylene, 1-bromo-2,2-difluoroethylene, (E)-1-bromo-1,2-difluoroethylene, (Z)-1-bromo-1,2-difluoroethylene, 1-bromo-1-fluoroethylene, (E)-1-bromo-2-fluoroethylene, (Z)-1-bromo-2-fluoroethylene, 1,1-dibromo-2-fluoroethylene, (E)-1,2-dibromo-2-fluoroethylene, (Z)-1,2-dibromo-2-fluoroethylene, and tribromofluoroethylene.

Of them, from the viewpoint of easy evaporation at normal temperature, bromotrifluoroethylene, 1-bromo-2,2-difluoroethylene, (E)-1-bromo-1,2-difluoroethylene, (Z)-1-bromo-1,2-difluoroethylene, 1-bromo-1-fluoroethylene, (E)-1-bromo-2-fluoroethylene, and (Z)-1-bromo-2-fluoroethylene are preferred.

Bromofluoroethylenes may be used singly or in combination of two or more of them.

[Inert Gas]

Examples of the inert gas include nitrogen gas ($N_2$), helium (He), argon (Ar), neon (Ne), krypton (Kr), and xenon (Xe). Of them, nitrogen gas, helium, argon, neon, and krypton are preferred, and nitrogen gas and argon are more preferred. These inert gases may be used singly or in combination of two or more of them.

[Adsorbent]

The adsorbent may be any type of adsorbent having pores with an average pore diameter of 0.4 nm or more and 4 nm or less. From the viewpoint of cost and easy availability, activated carbon, zeolite, silica gel, and alumina are preferred, and zeolite and activated carbon are more preferred.

Examples of the structure of the zeolite include a T type, an erionite type, a chabazite type, a 4A type, a 5A type, a ZSM-5 type, an LiLSX type, an $AlPO_4$-11 type, a ferrierite type, an offretite type, a mordenite type, a beta type, an $AlPO_4$-5 type, an NaY type, an NaX type, a CaX type, an $AlPO_4$-8 type, a UTD-1 type, a VPI-5 type, a cloverite type, an MCM-41 type, and a FSM-16 type. Of the zeolites, from the viewpoint of easy availability, molecular sieve 4A (for example, manufactured by Union Showa), molecular sieve 5A (for example, manufactured by Union Showa), molecular sieve 13X (for example, manufactured by Union Showa), and the like are specifically preferred.

An adsorbent having pores with an average pore diameter of 0.4 nm or more and 4 nm or less efficiently adsorbs bromofluoroethylenes and is unlikely to desorb the adsorbed bromofluoroethylenes.

The adsorbent may have any shape and may be, for example, in a fibrous shape, a honeycomb shape, a cylinder shape, a pellet shape, a crushed shape, a granular shape, or a powder shape.

[Temperature of Adsorption Treatment]

The adsorption treatment with the adsorbent 7 is required to be performed in a temperature environment of not less than 0° C. and less than 120° C. and is preferably performed in a temperature environment of 0° C. or more and 100° C. or less and more preferably in a temperature environment of 0° C. or more and 70° C. or less.

When the adsorption treatment is performed by bringing a bromofluoroethylene-containing gas into contact with the adsorbent 7 in the above temperature environment, the adsorbed bromofluoroethylene is unlikely to be desorbed from the adsorbent 7, and thus a larger amount of the bromofluoroethylene is adsorbed. In addition, a massive device for temperature control is unnecessary, and thus the gas treatment device 1 can have a simple structure. Moreover, the bromofluoroethylene is unlikely to be liquified in the adsorption column 6.

[Additional Adsorbing Conditions]

Adsorbing conditions such as the content (concentration) of a bromofluoroethylene in the bromofluoroethylene-containing gas, the flow rate of the bromofluoroethylene-containing gas, the amount of the adsorbent 7, and the size of the adsorption column 6 are not specifically limited and can be appropriately designed depending, for example, on the type and amount of the bromofluoroethylene-containing gas. However, the content (concentration) of the bromofluoroethylene in the bromofluoroethylene-containing gas can be 50% by volume or less and is preferably 30% by volume or less and more preferably 25% by volume or less.

EXAMPLES

The present invention will next be described in further detail with reference to examples and comparative examples.

Example 1

A gas treatment device having a similar structure to that of the gas treatment device 1 illustrated in the FIGURE was used to perform adsorption treatment of a bromofluoroethylene-containing gas. The gas treatment device includes a stainless-steel adsorption column having an inner diameter of 1 inch and a length of 100 mm, and in the adsorption column, 28.7 g of molecular sieve 13X (manufactured by Union Showa) was packed as an adsorbent.

The molecular sieve 13X has pores with an average pore diameter of 1.0 nm. The average pore diameter was determined by the BET adsorption method. The measurement conditions are as described below.

Measurement device: BELSORP-max manufactured by Nikkiso

Adsorbate: nitrogen gas

Measurement temperature: −196° C.

Pretreatment of adsorbent: heated and dried at 300° C. for 6 hours in vacuo

Amount of adsorbent used: 0.10 g

A mixed gas of bromotrifluoroethylene and dry nitrogen (the content of bromotrifluoroethylene in the mixed gas was 20% by volume) was fed to the adsorption column at a flow rate of 50 mL/min, and adsorption treatment was performed. During the adsorption treatment, the temperature in the adsorption column (specifically, the surface temperature of the adsorbent) was maintained at 30.0 to 40.0° C.

The concentration of bromotrifluoroethylene in the treated gas discharged from the outlet of the adsorption column was determined with the Fourier transformation infrared spectrophotometer. As a result, the concentration of bromotrifluoroethylene for 30 minutes immediately after the feeding start of the mixed gas was 206.35 to 273.81 ppm by volume (see Table 1). In other words, when molecular sieve 13X was used as the adsorbent, 99.86 to 99.90% of bromotrifluoroethylene was adsorbed by the adsorbent.

TABLE 1

| | Example 1 | |
|---|---|---|
| Time (min) | Concentration (ppm by volume) | Removal rate of bromotrifluoroethylene (%) |
| 0 | 273.81 | 99.86 |
| 5 | 250.00 | 99.88 |
| 10 | 230.16 | 99.88 |
| 15 | 230.16 | 99.88 |
| 20 | 206.35 | 99.90 |
| 30 | 206.35 | 99.90 |

Example 2

The adsorption treatment of bromotrifluoroethylene was performed in the same manner as in Example 1 except that coconut shell activated carbon (manufactured by Osaka Gas Chemicals) was used as the adsorbent in place of molecular sieve 13X. The coconut shell activated carbon has pores with an average pore diameter of 2.5 nm. As a result, the concentration of bromotrifluoroethylene for 30 minutes immediately after the feeding start of the mixed gas was 27.78 to 436.51 ppm by volume (see Table 2). In other words, when coconut shell activated carbon was used as the adsorbent, 99.78 to 99.99% of bromotrifluoroethylene was adsorbed by the adsorbent.

TABLE 2

| | Example 2 | |
|---|---|---|
| Time (min) | Concentration (ppm by volume) | Removal rate of bromotrifluoroethylene (%) |
| 0 | 436.51 | 99.78 |
| 5 | 202.38 | 99.90 |
| 10 | 107.14 | 99.95 |
| 15 | 71.43 | 99.96 |
| 20 | 55.56 | 99.97 |
| 30 | 27.78 | 99.99 |

Example 3

The adsorption treatment of bromotrifluoroethylene was performed in the same manner as in Example 1 except that coal-based activated carbon (manufactured by Osaka Gas Chemicals) was used as the adsorbent in place of molecular sieve 13X. The coal-based activated carbon has pores with an average pore diameter of 3.4 nm. As a result, the concentration of bromotrifluoroethylene for 30 minutes immediately after the feeding start of the mixed gas was 23.81 to 369.05 ppm by volume (see Table 3). In other words, when coal-based activated carbon was used as the adsorbent, 99.82 to 99.99% of bromotrifluoroethylene was adsorbed by the adsorbent.

TABLE 3

Example 3

| Time (min) | Concentration (ppm by volume) | Removal rate of bromotrifluoroethylene (%) |
|---|---|---|
| 0 | 369.05 | 99.82 |
| 5 | 210.32 | 99.89 |
| 10 | 123.02 | 99.94 |
| 15 | 55.56 | 99.97 |
| 20 | 39.68 | 99.98 |
| 30 | 23.81 | 99.99 |

Example 4

The adsorption treatment of bromotrifluoroethylene was performed in the same manner as in Example 1 except that molecular sieve 5A (manufactured by Union Showa) was used as the adsorbent in place of molecular sieve 13X. The molecular sieve 5A has pores with an average pore diameter of 0.5 nm.

As a result, the concentration of bromotrifluoroethylene immediately after the feeding start of the mixed gas was 630.95 ppm by volume, and the concentration of bromotrifluoroethylene at 5 minutes after the feeding start of the mixed gas was 5,507.94 ppm by volume (see Table 4). The reason for the reduction in the adsorption efficiency is supposedly breaking through of the absorbent. In other words, when molecular sieve 5A was used as the adsorbent, the adsorption capacity was inferior to molecular sieve 13X and the above activated carbons, but not less than 97% of bromotrifluoroethylene was adsorbed.

TABLE 4

Example 4

| Time (min) | Concentration (ppm by volume) | Removal rate of bromotrifluoroethylene (%) |
|---|---|---|
| 0 | 630.95 | 99.70 |
| 2 | 1424.60 | 99.30 |
| 5 | 5507.94 | 97.20 |

Example 5

The adsorption treatment of bromotrifluoroethylene was performed in the same manner as in Example 1 except that the temperature in the adsorption column was 60 to 70° C. As a result, the concentration of bromotrifluoroethylene at 15 minutes after the feeding start of the mixed gas was 503.97 ppm by volume, and the concentration of bromotrifluoroethylene after 20 minutes was 2,222.22 ppm by volume (see Table 5).

The reason for the reduction in the adsorption efficiency as compared with Example 1 is supposedly an accelerated desorption of bromotrifluoroethylene by heating the adsorbent. However, not less than 98% of bromotrifluoroethylene was adsorbed even in the condition.

TABLE 5

Example 5

| Time (min) | Concentration (ppm by volume) | Removal rate of bromotrifluoroethylene (%) |
|---|---|---|
| 0 | 273.81 | 99.86 |
| 5 | 265.87 | 99.87 |
| 10 | 293.65 | 99.85 |
| 15 | 503.97 | 99.75 |
| 20 | 2222.22 | 98.89 |

Example 6

The adsorption treatment of bromotrifluoroethylene was performed in the same manner as in Example 1 except that the temperature in the adsorption column was 0 to 5° C. As a result, the concentration of bromotrifluoroethylene for 30 minutes immediately after the feeding start of the mixed gas was 19.84 to 206.35 ppm by volume (see Table 6). The reason for the improvement in the adsorption capacity as compared with Example 1 is supposedly a suppressed desorption of bromotrifluoroethylene by cooling the adsorbent.

TABLE 6

Example 6

| Time (min) | Concentration (ppm by volume) | Removal rate of bromotrifluoroethylene (%) |
|---|---|---|
| 0 | 206.35 | 99.90 |
| 5 | 23.81 | 99.99 |
| 10 | 19.84 | 99.99 |
| 15 | 19.84 | 99.99 |
| 20 | 19.84 | 99.99 |
| 30 | 19.84 | 99.99 |

Example 7

The adsorption treatment of 1-bromo-1-fluoroethylene was performed in the same manner as in Example 1 except that a mixed gas of 1-bromo-1-fluoroethylene and dry nitrogen (the content of 1-bromo-1-fluoroethylene in the mixed gas was 20% by volume) was used as the bromofluoroethylene-containing gas. As a result, the concentration of 1-bromo-1-fluoroethylene for 30 minutes immediately after the feeding start of the mixed gas was 178.57 to 202.38 ppm by volume (see Table 7). In other words, when molecular sieve 13X was used as the adsorbent, 99.90 to 99.91% of 1-bromo-1-fluoroethylene was adsorbed by the adsorbent.

TABLE 7

Example 7

| Time (min) | Concentration (ppm by volume) | Removal rate of 1-bromo-1-fluoroethylene (%) |
|---|---|---|
| 0 | 202.38 | 99.90 |
| 5 | 186.51 | 99.91 |
| 10 | 178.57 | 99.91 |
| 15 | 178.57 | 99.91 |
| 20 | 178.57 | 99.91 |
| 30 | 178.57 | 99.91 |

Example 8

The adsorption treatment of 1-bromo-1-fluoroethylene was performed in the same manner as in Example 7 except that coal-based activated carbon (manufactured by Osaka Gas Chemicals) was used as the adsorbent in place of molecular sieve 13X. As a result, the concentration of 1-bromo-1-fluoroethylene for 30 minutes immediately after the feeding start of the mixed gas was 23.81 to 206.35 ppm by volume (see Table 8). In other words, when coal-based activated carbon was used as the adsorbent, 99.90 to 99.99% of 1-bromo-1-fluoroethylene was adsorbed by the adsorbent.

TABLE 8

Example 8

| Time (min) | Concentration (ppm by volume) | Removal rate of 1-bromo-1-fluoroethylene (%) |
|---|---|---|
| 0 | 206.35 | 99.90 |
| 5 | 123.02 | 99.94 |
| 10 | 23.81 | 99.99 |
| 15 | 23.81 | 99.99 |
| 20 | 23.81 | 99.99 |
| 30 | 23.81 | 99.99 |

Example 9

The adsorption treatment of 1-bromo-2-fluoroethylene was performed in the same manner as in Example 1 except that a mixed gas of 1-bromo-2-fluoroethylene (equimolar mixture of (E)-1-bromo-2-fluoroethylene and (Z)-1-bromo-2-fluoroethylene) and dry nitrogen (the content of 1-bromo-2-fluoroethylene in the mixed gas was 20% by volume) was used as the bromofluoroethylene-containing gas. As a result, the concentration of 1-bromo-2-fluoroethylene for 30 minutes immediately after the feeding start of the mixed gas was 162.70 to 285.71 ppm (see Table 9). In other words, when molecular sieve 13X was used as the adsorbent, 99.86 to 99.92% of 1-bromo-2-fluoroethylene was adsorbed by the adsorbent.

TABLE 9

Example 9

| Time (min) | Concentration (ppm by volume) | Removal rate of 1-bromo-2-fluoroethylene (%) |
|---|---|---|
| 0 | 285.71 | 99.86 |
| 5 | 253.97 | 99.87 |
| 10 | 218.25 | 99.89 |
| 15 | 162.70 | 99.92 |
| 20 | 162.70 | 99.92 |
| 30 | 162.70 | 99.92 |

Example 10

The adsorption treatment of 1-bromo-2-fluoroethylene (equimolar mixture of (E)-1-bromo-2-fluoroethylene and (Z)-1-bromo-2-fluoroethylene) was performed in the same manner as in Example 9 except that coal-based activated carbon (manufactured by Osaka Gas Chemicals) was used as the adsorbent in place of molecular sieve 13X. As a result, the concentration of 1-bromo-2-fluoroethylene for 30 minutes immediately after the feeding start of the mixed gas was 19.84 to 166.67 ppm by volume (see Table 10). In other words, when coal-based activated carbon was used as the adsorbent, 99.92 to 99.99% of 1-bromo-2-fluoroethylene was adsorbed by the adsorbent.

TABLE 10

Example 10

| Time (min) | Concentration (ppm by volume) | Removal rate of 1-bromo-2-fluoroethylene (%) |
|---|---|---|
| 0 | 166.67 | 99.92 |
| 5 | 126.98 | 99.94 |
| 10 | 83.33 | 99.96 |
| 15 | 39.68 | 99.98 |
| 20 | 19.84 | 99.99 |
| 30 | 19.84 | 99.99 |

Example 11

The adsorption treatment of 1-bromo-2,2-difluoroethylene was performed in the same manner as in Example 1 except that a mixed gas of 1-bromo-2,2-difluoroethylene and dry nitrogen (the content of 1-bromo-2,2-difluoroethylene in the mixed gas was 20% by volume) was used as the bromofluoroethylene-containing gas. As a result, the concentration of 1-bromo-2,2-difluoroethylene for 30 minutes immediately after the feeding start of the mixed gas was 150.79 to 246.03 ppm by volume (see Table 11). In other words, when molecular sieve 13X was used as the adsorbent, 99.88 to 99.92% of 1-bromo-2,2-difluoroethylene was adsorbed by the adsorbent.

TABLE 11

Example 11

| Time (min) | Concentration (ppm by volume) | Removal rate of 1-bromo-2,2-difluoroethylene (%) |
|---|---|---|
| 0 | 246.03 | 99.88 |
| 5 | 194.44 | 99.90 |
| 10 | 170.63 | 99.91 |
| 15 | 150.79 | 99.92 |
| 20 | 150.79 | 99.92 |
| 30 | 150.79 | 99.92 |

Example 12

The adsorption treatment of 1-bromo-2,2-difluoroethylene was performed in the same manner as in Example 11 except that coal-based activated carbon (manufactured by Osaka Gas Chemicals) was used as the adsorbent in place of molecular sieve 13X. As a result, the concentration of 1-bromo-2,2-difluoroethylene for 30 minutes immediately after the feeding start of the mixed gas was 23.81 to 206.35 ppm by volume (see Table 12). In other words, when coal-based activated carbon was used as the adsorbent, 99.90 to 99.99% of 1-bromo-2,2-difluoroethylene was adsorbed by the adsorbent.

TABLE 12

Example 12

| Time (min) | Concentration (ppm by volume) | Removal rate of 1-bromo-2,2-difluoroethylene (%) |
| --- | --- | --- |
| 0 | 206.35 | 99.90 |
| 5 | 134.92 | 99.93 |
| 10 | 71.43 | 99.96 |
| 15 | 27.78 | 99.99 |
| 20 | 23.81 | 99.99 |
| 30 | 27.78 | 99.99 |

Comparative Example 1

The adsorption treatment of bromotrifluoroethylene was performed in the same manner as in Example 1 except that B type silica gel (manufactured by Toyotakako) was used as the adsorbent in place of molecular sieve 13X. The B type silica gel has pores with an average pore diameter of 6.0 nm. As a result, bromotrifluoroethylene at a concentration more than the quantitative measurement limit (8,000 ppm) was detected within 2 minutes after the feeding start of the mixed gas. In other words, when B type silica gel was used as the adsorbent, bromotrifluoroethylene was not adsorbed.

Comparative Example 2

The adsorption treatment of bromotrifluoroethylene was performed in the same manner as in Example 1 except that molecular sieve 3A (manufactured by Union Showa) was used as the adsorbent in place of molecular sieve 13X. The molecular sieve 3A has pores with an average pore diameter of 0.3 nm. As a result, bromotrifluoroethylene at a concentration more than the quantitative measurement limit (8,000 ppm) was detected immediately after the feeding start of the mixed gas. In other words, when molecular sieve 3A was used as the adsorbent, bromotrifluoroethylene was not adsorbed.

Comparative Example 3

The adsorption treatment of bromotrifluoroethylene was performed in the same manner as in Example 1 except that γ-alumina (manufactured by Kojundo Chemical Laboratory) was used as the adsorbent in place of molecular sieve 13X. The γ-alumina has pores with an average pore diameter of 8.5 nm. As a result, bromotrifluoroethylene at a concentration more than the quantitative measurement limit (8,000 ppm) was detected immediately after the feeding start of the mixed gas. In other words, when γ-alumina was used as the adsorbent, bromotrifluoroethylene was not adsorbed.

Comparative Example 4

The adsorption treatment of bromotrifluoroethylene was performed in the same manner as in Example 1 except that the temperature in the adsorption column was 120° C. As a result, bromotrifluoroethylene at a concentration more than the quantitative measurement limit (8,000 ppm) was detected immediately after the feeding start of the mixed gas. In other words, when the temperature in the adsorption column was a high temperature of not less than 120° C., bromotrifluoroethylene was not adsorbed.

Comparative Example 5

The adsorption treatment of 2-bromo-1,1,3,3,3-pentafluoropropene was performed in the same manner as in Example 4 except that a mixed gas of 2-bromo-1,1,3,3,3-pentafluoropropene and dry nitrogen (the content of 2-bromo-1,1,3,3,3-pentafluoropropene in the mixed gas was 20% by volume) was used as the treatment gas. As a result, 2-bromo-1,1,3,3,3-pentafluoropropene at a concentration more than the quantitative measurement limit (8,000 ppm) was detected immediately after the feeding start of the mixed gas. In other words, when molecular sieve 5A was used as the adsorbent, 2-bromo-1,1,3,3,3-pentafluoropropene was not adsorbed.

Comparative Example 6

The adsorption treatment of 2-bromo-1,1,3,3,3-pentafluoropropene was performed in the same manner as in Example 1 except that a mixed gas of 2-bromo-1,1,3,3,3-pentafluoropropene and dry nitrogen (the content of 2-bromo-1,1,3,3,3-pentafluoropropene in the mixed gas was 20% by volume) was used as the treatment gas. As a result, 2-bromo-1,1,3,3,3-pentafluoropropene at a concentration more than the quantitative measurement limit (8,000 ppm) was detected at 10 minutes after the feeding start of the mixed gas. In other words, when molecular sieve 13X was used as the adsorbent, the adsorption amount of 2-bromo-1,1,3,3,3-pentafluoropropene was less than the adsorption amount of bromotrifluoroethylene.

REFERENCE SIGNS LIST

1 gas treatment device
2 bromofluoroethylene gas feeding mechanism
3 inert gas feeding mechanism
4 inlet
5 outlet
6 adsorption column
7 adsorbent
8 Fourier transformation infrared spectrophotometer
9 discharge pipe

The invention claimed is:

1. A gas treatment method comprising:
   bringing a gas containing a bromofluoroethylene into contact with an adsorbent having pores with an average pore diameter of 0.4 nm or more and 4 nm or less in a temperature environment of not less than 0° C. and less than 120° C. to allow the adsorbent to adsorb the bromofluoroethylene, and
   separating the bromofluoroethylene from the gas.

2. The gas treatment method according to claim 1, wherein the bromofluoroethylene is at least one of bromotrifluoroethylene, 1-bromo-2,2-difluoroethylene, (E)-1-bromo-1,2-difluoroethylene, (Z)-1-bromo-1,2-difluoroethylene, 1-bromo-1-fluoroethylene, (E)-1-bromo-2-fluoroethylene, (Z)-1-bromo-2-fluoroethylene, 1,1-dibromo-2-fluoroethylene, (E)-1,2-dibromo-2-fluoroethylene, (Z)-1,2-dibromo-2-fluoroethylene, and tribromofluoroethylene.

3. The gas treatment method according to claim 1, wherein the gas containing a bromofluoroethylene is a mixed gas of the bromofluoroethylene and an inert gas.

4. The gas treatment method according to claim 3, wherein the inert gas is at least one of nitrogen gas, helium, argon, neon, and krypton.

5. The gas treatment method according to claim 1, wherein the gas containing a bromofluoroethylene contains the bromofluoroethylene at a content of less than 25% by volume.

6. The gas treatment method according to claim 1, wherein the adsorbent is at least one of zeolite and activated carbon.

7. The gas treatment method according to claim 1, wherein the temperature environment is 0° C. or more and 100° C. or less.

8. The gas treatment method according to claim 1, wherein the temperature environment is 0° C. or more and 70° C. or less.

9. The gas treatment method according to claim 1, the method using a gas treatment device including an adsorption treatment container containing an adsorbent having pores with an average pore diameter of 0.4 nm or more and 4 nm or less, wherein the adsorption treatment container includes an inlet through which a gas containing a bromofluoroethylene is fed and an outlet through which a treated gas after adsorption treatment of the gas containing a bromofluoroethylene with the adsorbent is discharged from an inside of the adsorption treatment container to an outside.

10. The gas treatment method according to claim 2, wherein the gas containing a bromofluoroethylene is a mixed gas of the bromofluoroethylene and an inert gas.

11. The gas treatment method according to claim 2, wherein the gas containing a bromofluoroethylene contains the bromofluoroethylene at a content of less than 25% by volume.

12. The gas treatment method according to claim 3, wherein the gas containing a bromofluoroethylene contains the bromofluoroethylene at a content of less than 25% by volume.

13. The gas treatment method according to claim 4, wherein the gas containing a bromofluoroethylene contains the bromofluoroethylene at a content of less than 25% by volume.

14. The gas treatment method according to claim 2, wherein the adsorbent is at least one of zeolite and activated carbon.

15. The gas treatment method according to claim 3, wherein the adsorbent is at least one of zeolite and activated carbon.

16. The gas treatment method according to claim 4, wherein the adsorbent is at least one of zeolite and activated carbon.

17. The gas treatment method according to claim 5, wherein the adsorbent is at least one of zeolite and activated carbon.

18. The gas treatment method according to claim 2, wherein the temperature environment is 0° C. or more and 100° C. or less.

19. The gas treatment method according to claim 3, wherein the temperature environment is 0° C. or more and 100° C. or less.

20. The gas treatment method according to claim 4, wherein the temperature environment is 0° C. or more and 100° C. or less.

* * * * *